US012072857B2

(12) United States Patent
Stellmacher et al.

(10) Patent No.: US 12,072,857 B2
(45) Date of Patent: Aug. 27, 2024

(54) AUTOMATION OF MASTER DATA PROCESSES WITH USER-CENTRIC MANAGEMENT OF DERIVATION RULES

(71) Applicant: SAP SE, Walldorf (DE)

(72) Inventors: Sabine Stellmacher, Heidelberg (DE); Dirk Riemer, Rauenberg (DE); Christian Buschmann, Ladenburg (DE); Andreas Seifried, Hügelsheim (DE); Armin Maier, Dielheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/854,978

(22) Filed: Jun. 30, 2022

(65) Prior Publication Data
US 2024/0004846 A1    Jan. 4, 2024

(51) Int. Cl.
*G06F 16/00* (2019.01)
*G06F 16/215* (2019.01)
*G06F 16/22* (2019.01)
*G06F 16/2458* (2019.01)
*G06F 16/248* (2019.01)

(52) U.S. Cl.
CPC ........ *G06F 16/215* (2019.01); *G06F 16/2282* (2019.01); *G06F 16/2462* (2019.01); *G06F 16/248* (2019.01)

(58) Field of Classification Search
CPC ............... G06F 16/215; G06F 16/2282; G06F 16/2462; G06F 16/248

USPC .................................................. 707/600–899
See application file for complete search history.

(56) References Cited

U.S. PATENT DOCUMENTS

| | | | |
|---|---|---|---|
| 10,346,420 B2 | 7/2019 | Sundaram | |
| 10,394,805 B2 | 8/2019 | Warrier | |
| 2019/0228261 A1* | 7/2019 | Chan | G06F 16/221 |
| 2019/0370233 A1* | 12/2019 | Yamashita | G06F 16/254 |
| 2019/0392075 A1* | 12/2019 | Han | G06F 16/285 |
| 2020/0012930 A1* | 1/2020 | Kumar | G06F 16/3344 |
| 2020/0356562 A1* | 11/2020 | Nayak | G06F 16/9024 |
| 2021/0065016 A1 | 3/2021 | Riemer et al. | |
| 2021/0182695 A1 | 6/2021 | Wang et al. | |
| 2021/0209159 A1 | 7/2021 | Mahanta et al. | |
| 2021/0216544 A1* | 7/2021 | Hill | G06F 16/248 |
| 2022/0044298 A1* | 2/2022 | Oshinaike | G06V 20/52 |
| 2022/0277017 A1* | 9/2022 | Kabra | G06F 16/254 |

* cited by examiner

*Primary Examiner* — Michelle N Owyang
(74) *Attorney, Agent, or Firm* — Fish & Richardson P.C.

(57) ABSTRACT

In some implementations, generating enriched data includes actions of receiving a user input comprising object data. A communication with an analytics library is triggered to determine, by using an identification algorithm, a derivation scenario corresponding to the object data, the derivation scenario being stored in a relational database and comprising derivation rules. Modeled information is determined based on the derivation rules. Enriched data is generated based on the object data and by using the modeled information and provided for display.

20 Claims, 7 Drawing Sheets

AUTOMATION OF MASTER DATA PROCESSES WITH USER-CENTRIC MANAGEMENT OF DERIVATION RULES

BACKGROUND

Tools for master data maintenance have complex technical data models that support a variety of requirements corresponding to particular processes. The data models include multiple fields that have to be correctly filled or defaulted to contain initial values. The values of some fields can be derived from the value of one or more influencing field values, by using derivation logic. Actual derivation logic depends on a kind of data to be created and on a purpose of master data operation. An incorrect or incomplete data and operation description can lead to loss of effectiveness and efficiency of master data maintenance.

SUMMARY

Implementations of the present disclosure include computer-implemented methods for generating enriched data. The enriched data is generated by a model-driven approach to automate master data management activities to provide accurate data updates using a secure and computationally efficient process.

According to a first aspect, a method for generating enriched data is executed by one or more processors configured to perform actions including: receiving, by the one or more processors, a user input comprising object data; triggering, by the one or more processors, a communication with an analytics library to determine, by using an identification algorithm, a derivation scenario corresponding to the object data, the derivation scenario being stored in a relational database and comprising derivation rules; determining, by the one or more processors, modeled information based on the derivation rules; generating, by the one or more processors, enriched data based on the object data and by using the modeled information; and providing, by the one or more processors, the enriched data for display In some implementations, the operations further include receiving a definition of the derivation scenario for the object data, the definition semantically describing a derivation logic defining a sequence of the derivation rules. In some implementations, the operations further include assigning the derivation scenario and the derivation rules to an entity of a data model to implement a data change. In some implementations, the operations further include receiving a rule scope corresponding to the object data, and filtering the derivation rules using the rule scope. The derivation scenario can be used to generate the enriched data by applying a derivation scenario field rule or a derivation scenario table rule to derive data fields or data table entries for the object data, based on a table, a scope, and a field definition. The derivation scenario table rule can be used to derive lines used to modify original table data of the object data. Each of the derivation rules can include a set of condition fields and at least one result field.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The subject matter described in this specification can be implemented so as to realize one or more of the following advantages. First, master data management is a fully automated process that can be completed without delays due to secondary user inputs. For example, users can adjust the automation rules without support of an information technology department. Second, master data management is optimized by selecting rules, corresponding to the derivation scenario, using a machine learning technique, such as association rule mining. Third, the master data management is optimized by using collective data rules that are based on a plurality of semantically related rules designed to increase data processing efficiencies.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to generating enriched data for automatically filling out fields of master data records. More particularly, implementations of the present disclosure are directed to defining data derivation scenarios based on rules to automate master data management activities. The derivation scenarios offer automation of complex creation as well as maintenance processes that are highly dependent upon each other and which are intended to be applied on large-scale data. In general, a derivation scenario corresponding to large-scale object data is identified. The derivation scenario includes the derivation rules that can be used to determine whether particular types of data are associated with or depend upon each other and to derive enriched data, such that execution of derivation scenarios can be "limited" to background processes without user (e.g., human or machine) intervention. In some implementations, the execution can be considered "online" with a user waiting for the processing to complete. In some implementations, the execution can also be considered in "batch mode" and be invisible to the user. This increases the flexibility of embedding derivations in master data processes. The enriched data is used to update the master data records.

The relationships between particular attributes, or attribute values, of one or more relational database tables can be used to optimize master data management activities, such as by partitioning data to optimize database operations including select and join operations (e.g., reducing a number of multi-node selects or joins, or determining optimized paths between relations) or simplifying master data management (e.g., by reducing a number of user inputs).

Figure 1:
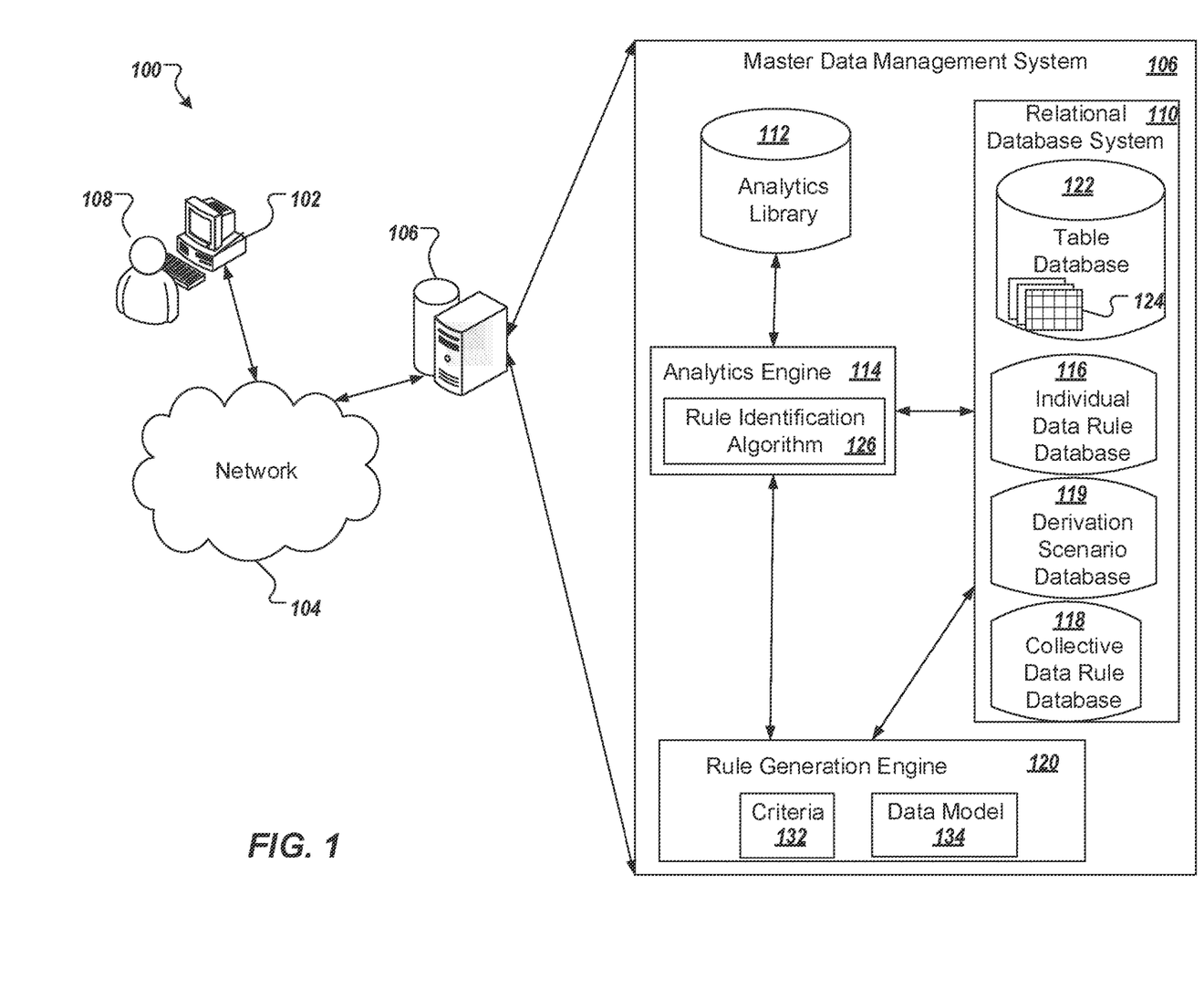
FIG. 1 is a schematic illustration of an example system architecture in accordance with implementations of the present disclosure.

Referring now to FIG. 1, an example system architecture 100 is illustrated for generating enriched data. The example system architecture 100 includes a user device 102, a network 104, and master data management system 106. As discussed in further detail herein, a user 108 can enter a user input on the user device 102 to request a data update using the master data management system 106. The user input can be transmitted by the user device 102 through the network 104 to the master data management system 106. The master data management system 106 can transmit the results of the data update through the network 104 to the user device 102 for presentation or display on the user device 102 or on any other user device connected to master data management system 106. Although a single user device 102 is illustrated, it is contemplated that, in some implementations, one or more user devices 102 can communicate with the master data management system 106 through the network 104.

The user device 102 can include any number of example devices including, but not limited to, a mobile phone, a smartphone, a tablet computing device, a personal digital assistant (PDA), a laptop personal computer (PC), a desktop PC, and/or appropriate combinations thereof. In the depicted example, the user device 102 includes a display, a processor, a memory, an input interface, and a communication interface. The processor can process instructions for execution of implementations of the present disclosure. The instructions can include, but are not limited to, instructions stored in the memory to display graphical information on the display. Example displays include, but are not limited to, a thin-film-transistor (TFT) liquid crystal display (LCD), or an organic light emitting diode (OLED) display. The memory stores information within the user device 102. In some implementations, the memory can include a volatile memory unit or units, and/or a non-volatile memory unit or units. In other implementations, removable memory can be provided, and can include, but is not limited to, a memory card. Example memory cards can include, but are not limited to, a secure digital (SD) memory card, a mini-SD memory card, a USB stick, and the like. In some implementations, the input interface can include a keyboard, a touchscreen, a mouse, a trackball, a microphone, a touchpad, and/or appropriate combinations thereof. In some implementations, an audio codec (not shown) can be provided, which receives audible input from a user or other source through a microphone, and converts the audible input to usable digital information. The audio codec can generate audible sound, such as through a speaker that is provided with the user device 102. Example sounds can include sound from voice telephone calls, recorded sound (e.g., voice messages, music files, etc.), and/or sound generated by applications operating on the user device 102.

The user device 102 can communicate with the network 104 through a connectivity interface(s). In some implementations, the connectivity interface(s) can include a satellite receiver, cellular network, a Bluetooth system, a Wi-Fi system (e.g., 802.x), a cable modem, a DSL/dial-up interface, a private branch exchange (PBX) system, and/or appropriate combinations thereof. Each of these connectivity interfaces 104 enables data to be transmitted to/from the network 104. In some implementations, the network 104 can be provided as a local area network (LAN), a wide area network (WAN), a wireless LAN (WLAN), a metropolitan area network (MAN), a personal area network (PAN), the Internet, and/or combinations thereof. In some implementations, other connectivity interface or network types as understood by one of ordinary skill in the art can be used.

Using network 104, the master data management system 106 can be connected to, for example and not limited to, a server system, a procurement system, an asset intelligence system, an enterprise resource planning system, a logistics system, a manufacturing system, and an asset service system. The master data management system 106 can also connect to other systems, as understood by ordinary skill in the art and consistent with this description. In the example system architecture 100 implementation of FIG. 1, the master data management system 106 includes a relational database system 110, an analytics library 112, an analytics engine 114, an individual data rule database 116, a collective data rule database 118, a derivation scenario database 119, and a rule generation engine 120.

In the illustrated implementation, the relational database system 110 includes a table database 122 configured to store one or more tables 124. The tables 124 can include a plurality of rows (or records) and a plurality of columns (or attributes or fields). In some implementations, based on analyzing records for one or more of the tables 124, associations can be determined between values for particular attributes in one or more tables 124.

Based on data in the table database 124, the analytics engine 114 can determine rules for the individual data rule database 116 or rules for the collective data rules database 118. The analytics engine 114 can also be used to create derivation scenarios for the derivation scenarios database 119 using the rule generation engine 120. Derivation scenarios and rules can also be created by the rule generation engine 120, directly and without using the analytics engine 114.

In some implementations, the associations can be determined using a rule identification algorithm 126 configured to communicate with an analytics library 112. For example, the analytics library 112 can include a library of rule composition definitions. The analytics library 112 can be stored on a tangible, non-transitory medium, and each block definition stored in the library may comprise (i) a target algorithm for performing an action with respect to data in the process control environment, and (ii) one or more rule compositions based on rule properties. The analytics service further includes rule identification algorithms (such as rule identification algorithm 126). Examples of rule identification algorithms include one, or a combination of, rule-mining algorithms, such as a machine learning algorithm, Apriori algorithm, ELCAT algorithm, FP-growth algorithm, or other algorithm(s). Executing the rule identification algorithm 126 on at least a portion of the tables 124 can provide one or more mined individual data rules stored in an individual data rule database 116. An individual data rule (such as an association rule) can include one or more conditions (antecedents) to define when the rule applies and one or more consequences that define outcomes expected to follow if the conditions are met. In some implementations, a rule can be considered to be in scope if the antecedents for the rule are satisfied. A rule can be considered to be satisfied, or valid, if the rule is in scope and all expected consequences of the rule are satisfied. A rule can be used to set values or the rule can be used to determine whether particular data is valid (e.g., satisfies the rule).

Although FIG. 1 describes individual data rules as being determined by the rule identification algorithm 126 of the analytics engine 114, in other cases all or a portion of the individual data rules can be retrieved from another source. For example, all or a portion of the individual data rules can be manually entered by the user 108 or another user, including variants of rules initially identified by the rule identification algorithm 126. For example, individual data rules can be imported from another repository or provided by another process. In some implementations, individual data rules can be associated with result statistics that can provide information about the accuracy of an individual data rule, such as in the tables 124 used for rule mining, or in a test or sample set of tables 124, to which the rules can be applied or another sample set. The result statistics can include a value indicating an amount (e.g., a percentage) of data that does not satisfy the rule, a value indicating an amount (e.g., a percentage) of data that satisfies the rule, and a value indicating an amount (e.g., a percentage) of data for which the rule is not in scope. In some cases, a user interface display can render result statistics in a stacked bar or column format, including, in some cases, color coding or otherwise visually distinguishing the values.

In some implementations, the analytics engine 114 can be configured to transmit the selected one or more individual data rules to the rule generation engine 120 to generate one or more collective data rules to be stored in a collective data rule database 118. The collective (or composite) data rules (for example, a data quality rule, such as for use in evaluating master data of an entity) can logically integrate multiple individual data rules. The collective data rules can include the individual data rules and can also include references to, the constituent individual data rules. In some implementations, the selected individual data rules are integrated based on rule criteria 132 and a data model 134 to generate a corresponding collective data rule. All or a portion of the individual data rules can be automatically selected for inclusion in the collective data rule. That is, a portion of the individual data rules can be modified or deleted by the rule generation engine 120 when generating the collective data rule.

The rule generation engine 120 can construct collective data rules using one or both of rule criteria 132 and a data model 134. Rule criteria 132 can include templates or criteria for selecting individual data rules to be included in a collective rule. Criteria can include, for example, criteria for determining when two individual rules are sufficiently related to be included in a collective data rule, such as having a threshold number (e.g., one or a plurality) of antecedents in common, having a threshold number (e.g., one or a plurality) of consequences in common, or being from the same table or related tables, etc.

Relatedness of tables, or of attributes between or within tables, can be determined with respect to the data model 134. In some implementations, the data model 134 can be a representation of relationships between the tables 124, such as showing relationships based on foreign keys, alternate keys, or associations between tables, or using information such as database triggers or views to determine how tables and their attributes are related. Some implementations of the data model 134 can include a data dictionary or information schema associated with the relational database system 110.

In further implementations, the data model 134 can include information regarding data objects (e.g., abstract data types) associated with the tables 124, such as data objects associated with the tables using object relational mapping. For example, if a given table 124 includes 20 attributes, and 5 are included in a particular data object (e.g., representing a product being produced using a production process), that information can be used in determining whether individual data rules that do or do not include the 5 attributes should be considered for inclusion in the same collective data rule. The associations (relationships) between such data objects can be used to determine whether relationships should be inferred between the attributes used in the related data objects (e.g., a product table is known to be related to a material table, which may in turn be related to a supplier table). The antecedents and consequences of the individual data rules in a collective rule can be associated with information regarding their source and which can be used to identify them. The information can include a table identifier, identifying in the table database 122, the table 124 associated with the antecedent or consequence. The information can also include an identifier for a field associated with the antecedent or consequence, and a value (or, optionally, plural values) associated with each field.

The information for the individual data rules in a collective data rule can be used to construct various rule artifacts. In some implementations, the rule artifacts can include one or more of a scope expression, a scope decision table, a condition expression, and a condition decision table. The scope decision table and the condition decision table can be created for a particular collective data rule. Correspondingly, the scope expression and the condition expression can be specified with respect to the corresponding scope decision table and the condition decision table, respectively.

In some implementations, the scope expression and the condition expression can be evaluated with respect to their respective scope decision table and condition decision table. That is, the scope expression and the condition expression can be constructed as conditional statements that evaluate to TRUE or FALSE depending on analysis results of the corresponding decision table.

The tables 124 can be generated, in some examples, by populating the antecedents or the consequences of individual data rules in a collective data rule into a suitable programming language, such as SQL. For example, a program can be written having a command such as: CREATE TABLE SCOPE (antecedent1, antecedent 2, antecedent n); where the antecedents from the actual individual data rules are inserted into the command prior to execution. For previously created tables 124 that are saved in the table database 122, a command can be provided to add addition columns, such as ALTER TABLE SCOPE ADD attribute_n+1; Individual data rules can then be represented in the relevant table by inserting the respective antecedent values 118 (in the case of the scope decision table 172), using a command such as: INSERT INTO SCOPE (value_antecedent1, value_antecedent2, . . . , value_antecedent_n) Similar commands can be used to create the condition decision table, or other computing artifacts used in implementing collective data rules.

After the collective rules are defined, and the corresponding rule artifacts are created, one or more of the collective rules can be used in some implementations to evaluate a data set, such as all or a portion of the database tables. Evaluation results can be provided in an evaluation report that is transmitted to the user device 102 for display. The evaluation results can include one or both of result statistics for a given collective data rule and result statistics for given individual data rules in the given collective data rule, where the result statistics can be at least generally similar to the result statistics.

In some implementations, the master data management system 105 (e.g., back end server) is modified, to separate database queries from other application code and user interface. One such architecture includes the Business Rule Framework Plus for web applications provided by SAP SE of Walldorf, Germany. In the Business Rule Framework Plus, the web application is largely executed as JavaScript in the web browser. The user interface components (e.g., images) and design (as well as other resources) are downloaded as HTML and CSS integrated with the JavaScript code. In order to persistently store and process data on the cloud server, the client issues requests (e.g., OData requests), which are processed by a database engine (e.g., SAP S/4HANA, Ariba Mobile, and SAP Hybris Cloud for Customer provided by SAP SE of Walldorf, Germany). In some implementations, the requests are translated into queries (e.g., SQL queries) for the relational database system 110. The user device 102 can process the evaluation report and can display the evaluation report including enriched data, using a dynamically created HTML.

Figure 2A:
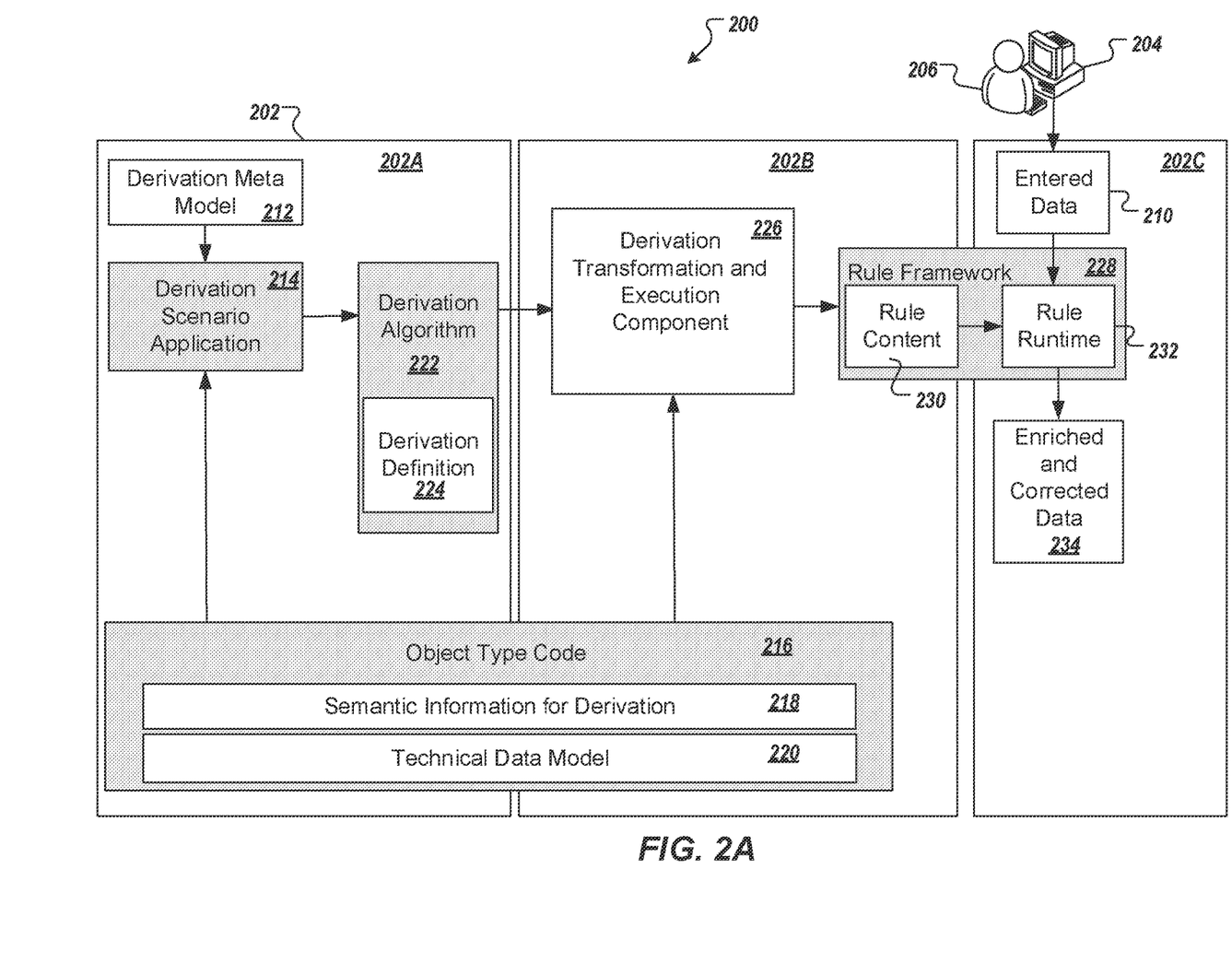
FIGS. 2A and 2B are examples of process flow diagrams in accordance with implementations of the present disclosure.

FIG. 2A illustrates an example process flow diagram 200 in accordance with implementations of the present disclosure. The process flow diagram 200 can be executed by a computer system 202 (e.g., the example system architecture 100 described with reference to FIG. 1) to automate the enrichment and correction of entered data. The computer system 202 can include a plurality of modules 202A, 202B, 202C. Each of the plurality of modules being configured to execute a portion of the process flow.

The computer system module 202C can be configured to receive, from a user device 204, a user input entered by a user 206. The user input can include entered data 210. The entered data can include data elements associated to an object instance. The data elements can include data objects, functions, and expressions. The data objects can include abstract data types. The data objects can be associated with tables using object relational mapping. Object type code 216 acts as an identifier that allows specification of a particular data model.

In some implementations, the receipt of the user input including entered data can trigger activation of a derivation meta model 212. The derivation meta model 212 can describe a logic to derive data from the entered data 210. The derivation meta model 212 can provide meta-data for the underlying domain specific data model, as well as execution framework for a derivation scenario application 214 in master data processes of the example process flow diagram 200.

The derivation scenario application 214 can derive master data based on rules and a defined scope of an object. The entered data is processed by the derivation scenario application 214 to be defined as part of a scenario including a semantic ID, a name, a description and the base table. The scenario base table indicates which data is the starting point and semantical basis for a scenario.

In some implementations, the user 206 defines the scenario scope on a scenario base table. The user 206 can define a scenario context as a filter for the data to be processed. The system 202 decides based on the scope, which datasets of the base table trigger the scenario processing. The derivation scenario application 214 can create multiple derivation rules. The user 206 can define a sequence, a granularity, and a scope, which allows a wide range of use cases. For example, a derivation scenario could take over the initial creation of a master data object with all relevant sub-entities. Taking over the initial creation of a master data object would result in a smaller number of bigger scenarios for each of the relevant use cases. In another example, derivation scenario application 214 can create more fine granular scenarios that would be defined on sub-entity level. Fine granular scenarios could be reused in different use cases. The differentiation can be based on a scope definition. In some implementations, a separate orchestration option can be implemented to reduce complexity of the derivation scenario process.

The derivation scenario application 214 can call or trigger a derivation transformation and execution component 226. The derivation transformation and execution component 226 can be configured to execute semantic information for derivation 218 and a technical data model 220. The semantic information for derivation 218 and technical data model 220 are defined by the object type code 216.

The semantic information for derivation 218 can be used to provide a semantic linkage of the derivation scenario at a data level. For example, each derivation scenario is executed after another derivation scenario and the result of one derivation scenario is the input for the next derivation scenario, which is a different approach than with the validation rules, where all rules are applied on the same dataset. The semantic definition can be configured only once for use in various process types, being established using the validation rules offered by master data rule management:

The technical data model 220 can be configured to execute technical derivation scenarios. In some implementations, the technical data model 220 can be configured to execute technical derivation scenarios using a technical catalog enhanced to carry all current as well as future navigation targets for master data quality with respect to a backend functionality. The technical data model 220 can convert the technical implementation of the user content (extracted from the entered data) into a class-based code representation. The conversion into a class-based code representation offers a powerful feature that the modeled content is temporarily versioned on timestamp level for execution at a specific point in time.

In some implementations, the technical implementation of a derivation scenario can be represented by Business Rule Framework Plus (BRF+) for web applications provided by SAP SE of Walldorf, Germany. Different BRF+ architectures can be considered for modeling the derivation scenarios in an executable fashion, especially in terms of the portion of the logic to be executed by BRF+ or a different platform (e.g., ABAP provided by SAP SE of Walldorf, Germany). In some implementations, the BRF+ application can be configured to execute all the logic of the technical derivation scenarios.

The semantic implementation of derivation scenarios generated by the semantic information for derivation 218 and the technical implementation of derivation scenarios generated by the technical data model 220 can be configured to be compatible with the existing capabilities of master data rule management. For example, the technical implementation of derivation scenarios can be configured for compatibility between the implementations of the derivation scenarios and the validation rules of the rule framework.

The derivation scenarios are transmitted by the derivation scenario application 214 to a derivation algorithm 222. The derivation algorithm 222 can define how a derivation definition 224 corresponding to the derivation scenario, received from the derivation scenario application 214, can be applied to an object data extracted by the derivation meta model 212 from the entered data 210.

The output of the derivation algorithm 222 can be transmitted to a rule framework 228. Various rule frameworks can be supported by using a derivation transformation and execution component 226. The derivation transformation component 226 can be configured to execute a transformation based on derivation scenario rules that specify how values of one or more fields of the entered data can be used to calculate values of other fields for enriched data, as described in detail with reference to FIG. 2B. For each rule for fields that is in scope, the linked data transformation on the entered data, can be executed by a rule framework 228.

In some implementations, the rule framework 228 can include a rule content module 230 and a rule runtime module 232. The rule framework 228 can be configured to retrieve rules corresponding to the derivation scenario by using the rule content module 230.

Some implementations of the rule content module 230 can be configured to perform maintenance of derivation rules. The maintenance of derivation rule includes the roles known from the derivation scenario in association to a rule owner and a data owner. The lifecycle of a rule is also represented by various states (e.g., new state, modified state, approved state), in which specific actions and status changes can be performed.

Each derivation rule can have a set of condition fields and requires at least one result field. The rule runtime module 232 can execute a decision logic to fill the result field(s) of the enriched data 234 with concrete values associated to respective user groups (e.g., data owner). The rule runtime module 232 can correct the enriched data 234 by processing a rule for corresponding fields of the entered data 210.

The correction of the enriched data 234 can include a comparison of the values of the fields of the entered data with condition fields. In case of a complete match the result fields are written in the enriched and corrected data 234. If rule runtime module 232 determines that condition fields are not existent in a data model, the value is considered as initial even though the value exists in an active table. In case the result field is not available in a corresponding table, the result is not mapped and therefore is excluded from the enriched and corrected data 234.

Figure 2B:
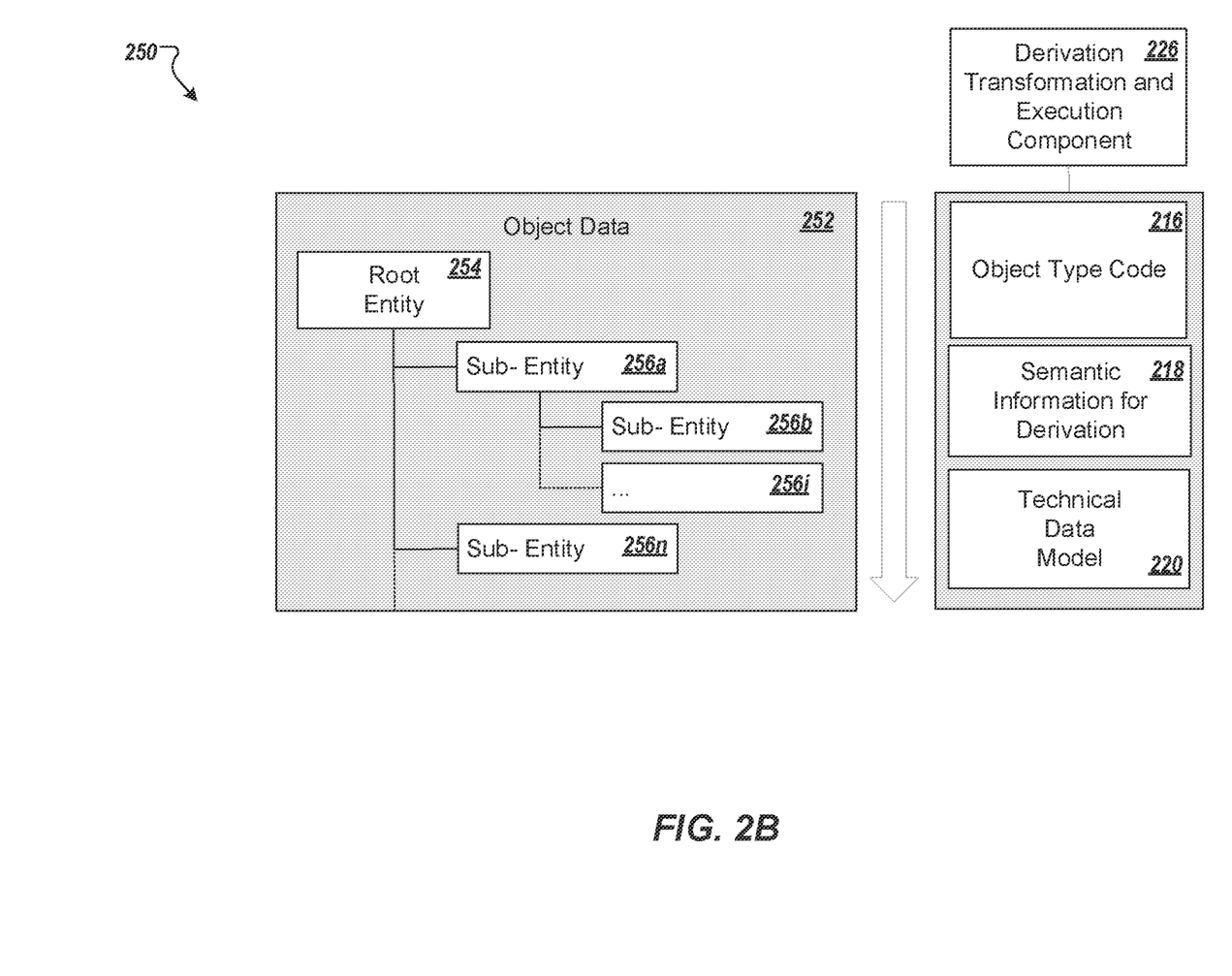

FIG. 2B illustrates a derivation transformation and execution process flow 250 in accordance with implementations of the present disclosure. The derivation transformation and execution process flow 250 can be a portion of the example process flow diagram 200 described with reference to FIG. 2.

The derivation transformation and execution process flow 250 can be executed by the derivation transformation and execution component 226. For object data 252 to be processed, the derivation transformation and execution component 226 can traverse a tree of entities from a root 254 of the object data 252 to each relevant sub-entity 256a, 256b, 256i, 256n. The object data 252 conforms to the data model identified with the object type code 216. In some implementations, the entities are retrieved from an entity repository based on a mapping between fields of active tables of the object data and the corresponding entities and sub entities. In some implementations, only a portion of the identified sub-entities of the object data 252 are being processed. Reducing the amount of data (selecting a portion of the identified sub-entities), which needs to be read requires a list of tables for which derivation rules are existent. The data can be reduced to a required minimum. In some implementations, the sub-entity selection rules can require at least the root data, a parent data and a data of a relevant base table. The sub-entity selection rules can be based on a structure of source tables used by a consolidation and mass processing model.

The derivation transformation and execution component 226 can process each of the selected entities and sub-entities to determine if there is a derivation scenario defined for the current entity. The derivation transformation and execution component 226 can process each scenario as defined by a sequence of scenarios in the derivation definition. The derivation transformation and execution component 226 can check if the current entity is in the scope of the currently processed scenario. If it is not in scope, proceed with the next scenario in sequence. For each scenario that is in scope, the derivation transformation and execution component 226 can process all derivation rules for fields in the sequence defined by the scenario. Check if the current entity is in the scope of the currently processed rule for fields. If it is not in scope, proceed with the next rule for fields. For each rule that is in scope, the derivation transformation and execution component 226 can execute the linked data transformation on the entity's data, for example by a rule framework. The derivation transformation and execution component 226 can store the result of the transformation in a result table, as specified by the derivation rule for fields. For a currently processed scenario, the derivation transformation and execution component 226 can process all derivation rules for tables in the sequence defined by the scenario. The derivation transformation and execution component 226 can check if the current entity is in the scope of the currently processed rule for tables. If it is not in scope, the derivation transformation and execution component 226 can proceed with the next rule for tables. For each rule for tables that is in scope, the derivation transformation and execution component 226 can execute the linked data transformation on the entity's data, for example by a rule framework. The derivation transformation and execution component 226 can store the result of the transformation in the result table, as specified the derivation rule for tables. If required, the derivation transformation and execution component 226 can create a new row in the result table.

Figure 3:
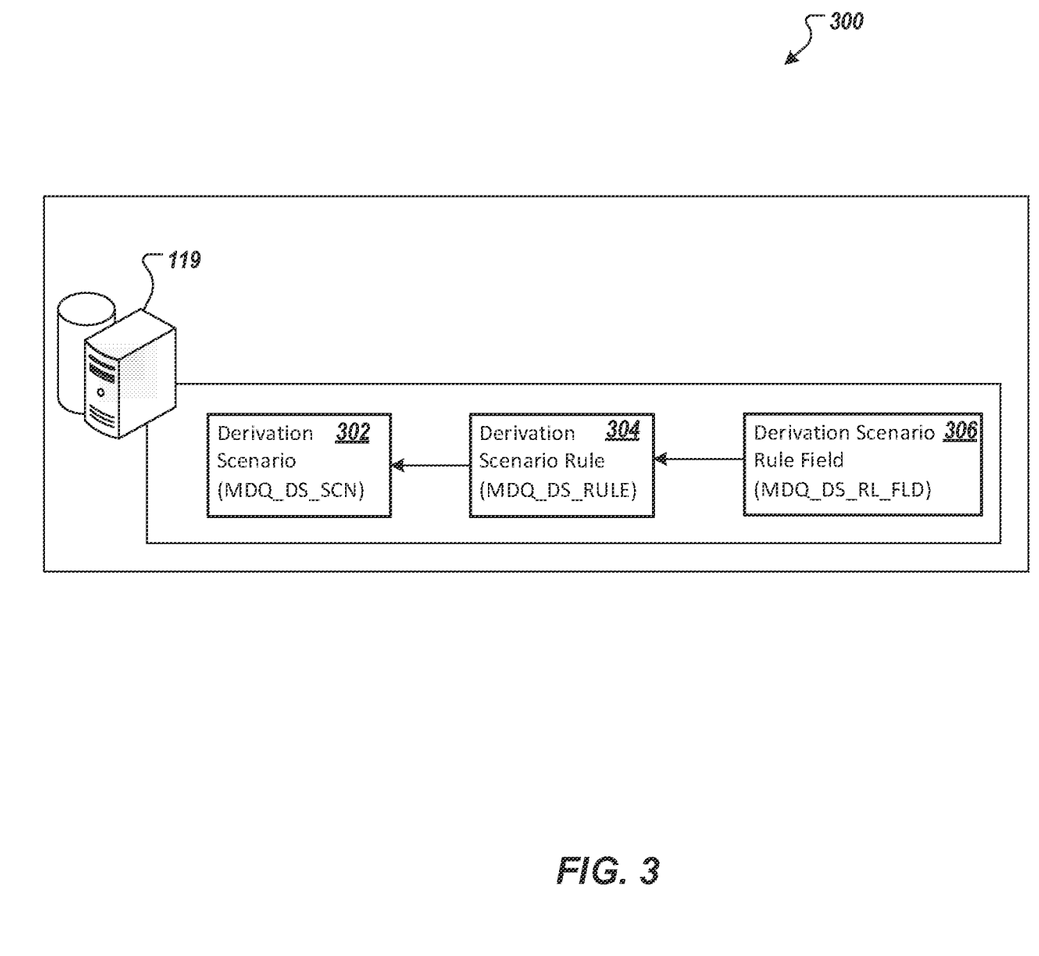
FIG. 3 is an example of a definition process for an example derivation scenario in accordance with implementations of the present disclosure.

FIG. 3 depicts an example derivation scenario 300 for a meta-model for generating enriched data, in accordance with implementations of the present disclosure. The derivation meta-model defines a derivation scenario 302 (MDQ_DS_SCN). The derivation scenario 302 describes how object data can be transformed to produce enriched and corrected data of the same object.

In some implementations, multiple scenarios can be used for one object type. If multiple scenarios are used, a sequence of the execution of multiple derivation scenarios can be defined and data input to a subsequent scenario includes the result of a preceding scenario. Within a derivation scenario multiple derivation rules can be created.

The data transformation applied to the object data can be based on derivation scenario rules 304 (MDQ_DS_RULE) that specify how values of fields shall be used to calculate values of other fields. The fields can be specified as derivation scenario rule fields 306 (MDQ_DS_RL_FLD), as described in detail with reference to FIG. 4.

Figure 4:
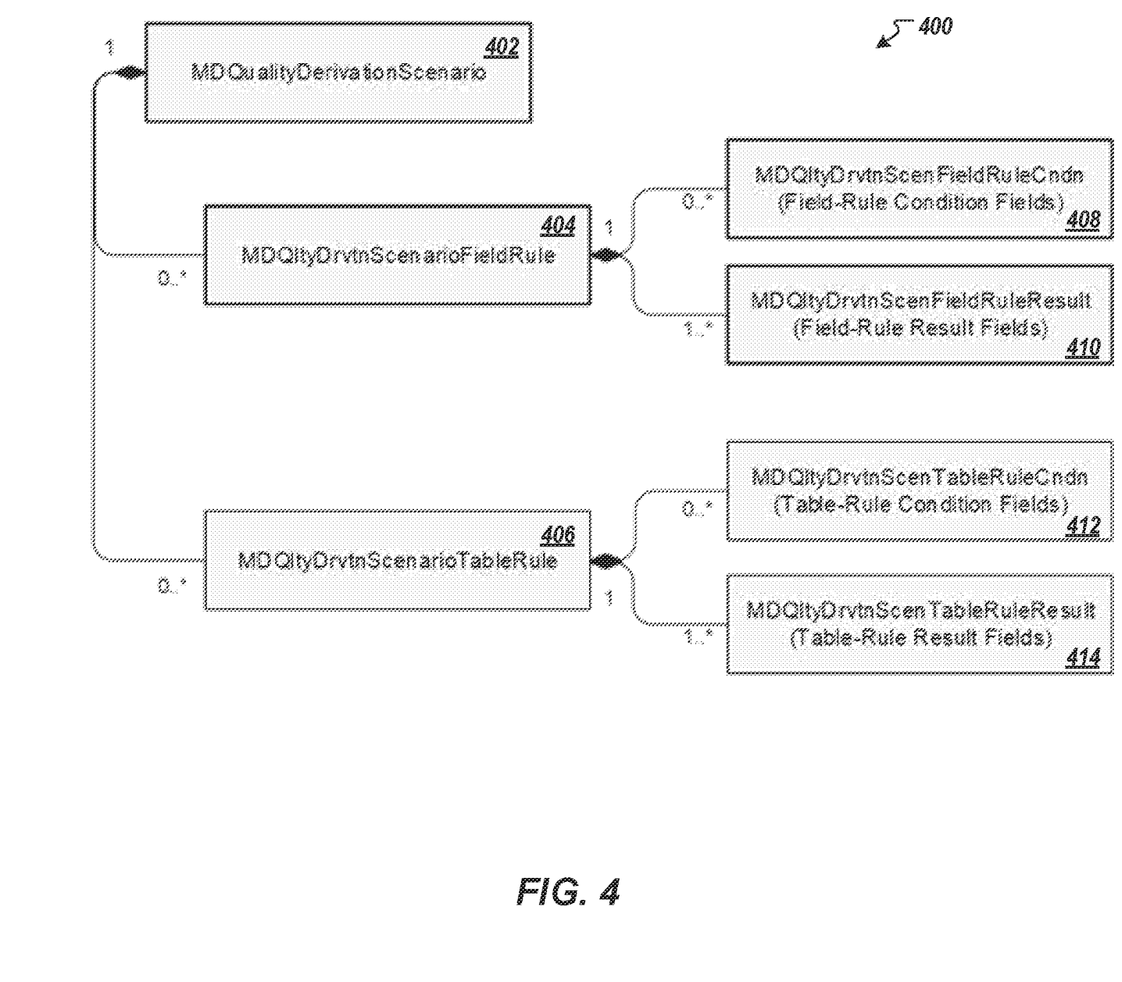
FIG. 4 depicts an example of a derivation scenario meta model in accordance with implementations of the present disclosure.

FIG. 4 depicts an example derivation scenario meta-model 400. The example derivation scenario meta-model 400 is a more detailed view of the model described with reference to FIG. 3. A Derivation Scenario 402 uses derivation rules to derive master data values based on a scope and a field definition. The corresponding data is defined as part of the rule (e.g., a semantic ID, a name, a description and the base table). The rule result table can indicate which type of data can be derived using the derivation scenario rule 304.

A derivation scenario field rule 404 derives master data fields for an existing data set based on a base table or a result table, a scope, and a field definition. A user can define the rule scope on the rule table and its context as a filter for the data fields to be processed. The system can use the defined scope to select, which datasets of the base table trigger the rule processing and are processed by the rule. The derivation scenario field rule 404 can be separately defined for condition fields 408 and result fields 410. The condition fields 408 can be fields of the base table or its context ("parent-root" principle) of the derivation rule or the derivation scenario. The result fields 410 can be fields of the result table of the derivation rule.

A master data quality derivation scenario table rule 406 derives master data table entries based on a base table or a result table, scope and field definition in order to ensure data quality. In some implementations, the derivation rule base table and result table can be different. The derivation rule base table and the result table can be subordinate tables of the scenario base table. The rule base table can also be the same as the scenario base table. The rule result table can be a subordinate table of the rule base table to prevent confusing rule constructions. The master data quality derivation scenario table rule 406 can be separately defined for condition fields 412 and result fields 414.

In some implementations, multiple rules can be used with the same rule base table. The data input for a subsequent derivation rule includes the result of a preceding derivation rule. In some implementations, a derivation scenario 302 can define the execution sequence of the rules. Each derivation rule can include a set of condition fields and at least one result field. The derivation scenario can be identified as completed when during the processing of a rule the corresponding fields of the entered data are compared with condition fields of the enriched data and a complete match of the result fields is generated.

Figure 5:
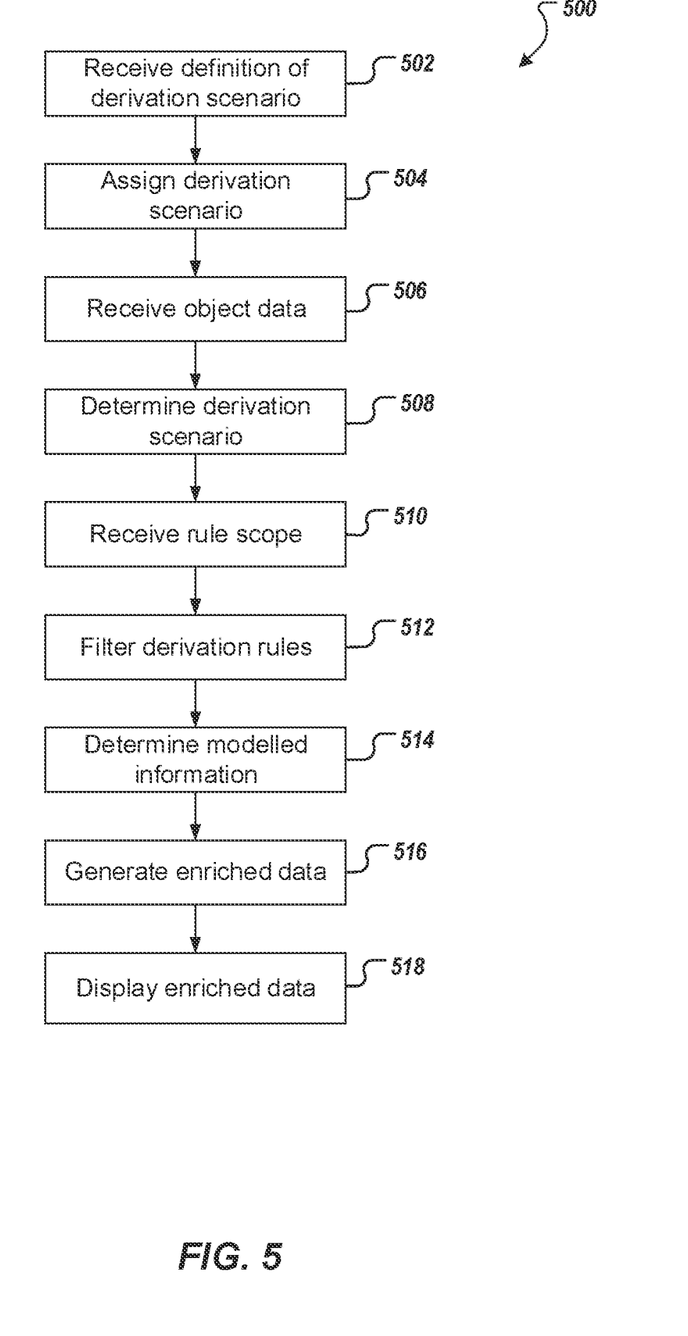
FIG. 5 depicts an example process in accordance with implementations of the present disclosure.

Referring now to FIG. 5 an example process 500 that can be executed in accordance with implementations of the present disclosure is depicted. In some implementations, the example process 500 can be executed to provide enriched data for automatically filling out fields of master data records. The actual derivation logic depends on the kind of data to be created. For example, whether it is a new material master data record or the extension of an existing material to a new plant. Furthermore, the derivation logic depends on the scope of the master data operation. For example, whether a new material master data record for a product sample is to be created, for which data can be copied from another material master data record.

In some implementations, the example process 500 can be provided by one or more computer-executable programs that are executed by one or more computing devices. In some implementations, the example process 500 can be provided as part of a computer-executable collaboration tool. In some implementations, a computer-executable collaboration tool can be provided in a client-server architecture. For example, user interfaces can be provided on one or more client computing devices for receiving user input. The user input can be transmitted to one or more server devices, which can process the user input as discussed herein.

As illustrated in FIG. 5, a definition of a derivation scenario for an object data is received by a system (e.g., a master data management system, such as system 106 described with reference to FIG. 1) (502). Derivation scenarios can be changed semantically and technically independently of their execution. In some implementations, the definition semantically describes a derivation logic defining a sequence of derivation rules and conditions, under which the derivations can be executed. The derivation logic can be reused and integrated in multiple the derivation scenarios, for which an existing rule infrastructure matches a rule execution. Each of the derivation rules includes a set of condition fields and at least one result field. Each of the condition fields can be processed to determine its value.

The derivation scenario and the derivation rules are assigned to an entity of a data model to implement a data change (504). The data model represents the basis of available fields and content of derivation scenarios, such that compatible data models are a natural pre-condition for a seamless integration of data changes.

A user input including object data is received (506). The object data can include fields of active tables corresponding to a tree of entities, including a root and each entity including one or more sub-entities. In some implementations, the entities can be retrieved from an entity repository based on a mapping between fields of active tables of the object data and the corresponding entities and sub entities.

A communication with a relational database, for example, the derivation scenario database 119 of FIG. 1, is triggered (508). The communication can determine, by using an identification algorithm, a derivation scenario corresponding to the object data.

A rule scope corresponding to the object data is received (510). The rule scope includes a scope expression describing a scenario scope defined by the user and one or more rule scopes that are each applied to a single rule identified in the corresponding rule scope by a rule identifier.

The derivation rules are filtered using the rule scope (512). The system can use the rule scope as a filter to decide based on the rule scope, which datasets of the base table trigger the scenario processing. For example, the rule scope can be used to select the sequence of the derivation rules, the granularity of the derivation rules, and the scope of the derivation rules, which provides flexibility for different building and orchestration approaches of derivation scenarios and rules. The derivation rules can include derivation rules for fields and derivation rules for tables. The derivation rules for fields derive data fields for an existing data set based on a base or a result table, scope and field definition in order to ensure data quality. The derivation rules for fields enable scope checks and derivations of field values for each entry of the rule base table, which can be the same as for the scenario or one of the subordinate tables. The base table can correspond to an existing data set and the result table can include a derivation of an existing data set. The derivation rules for tables derive data table entries based on a base or a result table, a scope, and a field definition in order to ensure data quality. The derivation rule base and result table can be different. The result table can be a subordinate table of a scenario base table. The rule base table can also be the same as the scenario base table. The rule result table can be conditioned to be below the rule base table. The conditioning of the rule result table can be used to prevent confusing rule constructions. Within derivation processing, an additional parent-root context can be defined without preventing access to the current scenario context. A derivation rule for tables derives lines as a table with a same type as the result table, which can be used to modify (create or update) the original table data. The keys of the result table can be defined as part of the result fields. In some implementations, the master data management can be optimized by filtering rules, corresponding to the derivation scenario, using a machine learning technique, such as association rule mining.

The modeled information is determined based on the derivation rules (514). The modeled information can include model tables and fields that were identified, using the derivation rules, as being relevant and valid for the received scenario. The automate the process, the fields of the modeled information can be filled with default initial values.

The enriched data is generated based on the object data and by using the modeled information (516). For example, the enriched data derivation scenario can be generated by applying the derivation scenario field rule or a derivation scenario table rule to derive data fields or data table entries for the object data, based on a table, a scope, and a field definition, wherein the derivation scenario table rule derives lines used to modify original table data of the object data according to the settings of the modeled information. The enriched data can act as a basis for a subsequent master data processing. The enriched data can be generated at runtime but can also be persisted for later processing or for later usage in master data processing. In some implementations, the enriched data created according to the modeled information in the derivation scenario can be automatically verified using one or more verification rules and the enriched data can be further modified and adjusted until the verification rules are satisfied.

The enriched data is provided (transmitted) for display (518). In some implementations, the enriched data is displayed in a manner that enables tracking of changes to the object data, such as field, column or row highlights. In some implementations, the enriched data is automatically used to update the master data records stored in a database (e.g., table database 124). In some implementations, a confirmation of completion of enriched data generation and storage process can trigger a closure of all service related statuses within the system and one or more additional systems. Using the example process 500, the introduction of derivation scenarios for master data rule management provides the capability to support automation by deriving object data. The derivation scenarios can be configured based on the well-known data models of associated platforms, independently of the later usage in master data processes. By this, the semantic derivation logic can be implemented and/or configured only once and later, the derivation logic can be used in various process types as it is already established using the validation rules offered by master data rule management.

Figure 6:
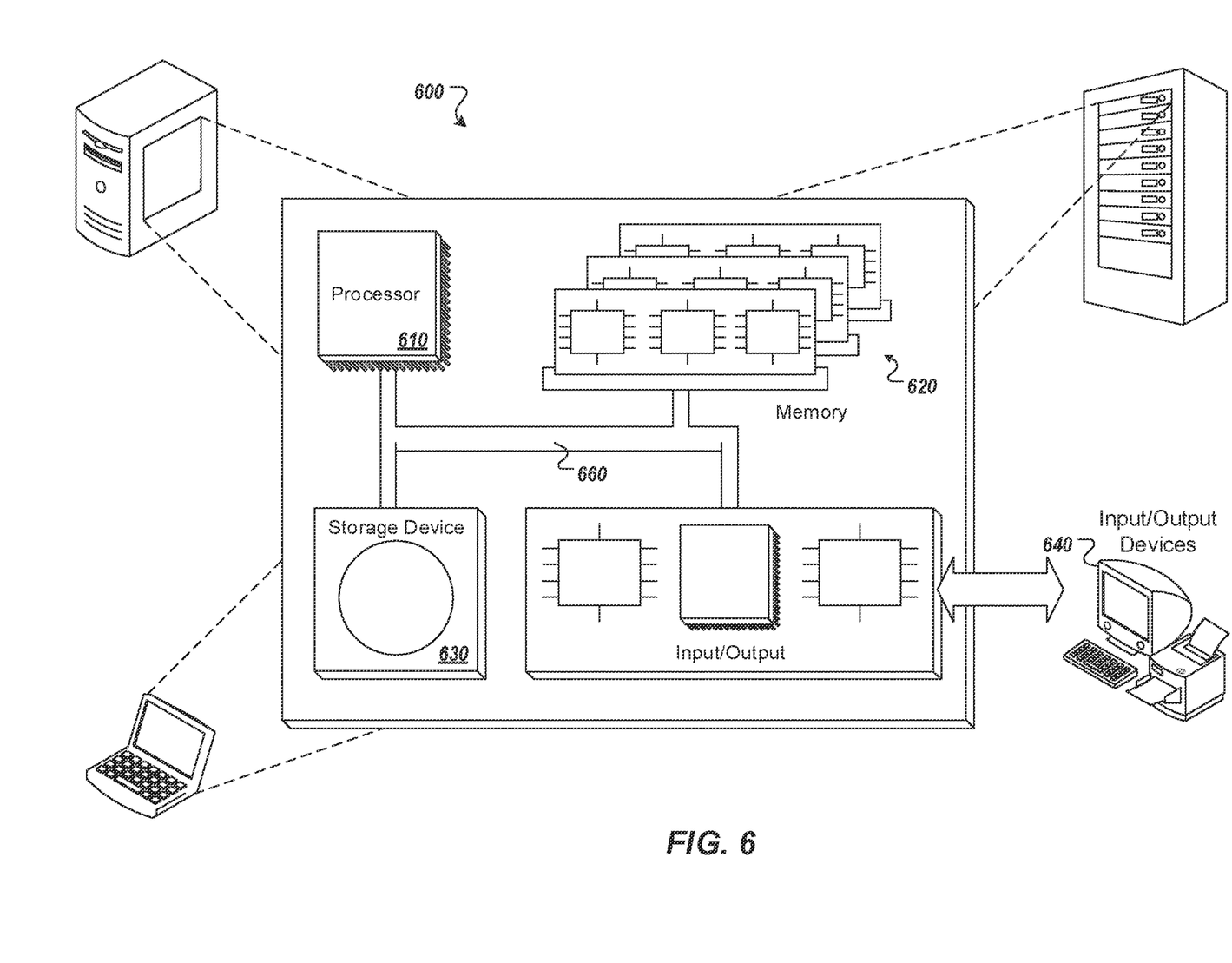
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method, comprising:
   receiving, by one or more processors, a user input comprising object data;
   triggering, by the one or more processors, a communication with an analytics library to determine, by using an identification algorithm, a derivation scenario corresponding to the object data, the derivation scenario being stored in a relational database and comprising derivation rules;
   determining, by the one or more processors, modeled information based on the derivation rules;
   generating, by the one or more processors, enriched data based on the object data and by using the modeled information;
   automatically verifying, by the one or more processors using one or more verification rules until the one or more verification rules are satisfied and as verified enriched data, the enriched data, wherein the enriched data is further modified and adjusted until the one or more verification rules are satisfied;
   automatically using, by the one or more processors, the verified enriched data to update master data records stored in the relational database; and
   displaying, by the one or more processors, the verified enriched data.

2. The computer-implemented method of claim 1, further comprising:
   receiving, by the one or more processors, a definition of the derivation scenario for the object data, the definition semantically describing a derivation logic defining a sequence of the derivation rules.

3. The computer-implemented method of claim 2, further comprising:
   assigning, by the one or more processors, the derivation scenario and the derivation rules to an entity of a data model to implement a data change.

4. The computer-implemented method of claim 1, further comprising:
   receiving, by the one or more processors, a rule scope corresponding to the object data; and
   filtering, by the one or more processors, the derivation rules using the rule scope.

5. The computer-implemented method of claim 1, wherein each of the derivation rules comprises a set of condition fields and at least one result field.

6. The computer-implemented method of claim 1, wherein the derivation scenario generates the enriched data by applying a derivation scenario field rule or a derivation scenario table rule to derive data fields or data table entries for the object data, based on a table, a scope, and a field definition.

7. The computer-implemented method of claim 6, wherein the derivation scenario table rule derives lines used to modify original table data of the object data.

8. A non-transitory, computer-readable medium storing one or more instructions that when executed by one or more processors, cause the processors to perform operations comprising:
   receiving a user input comprising object data;
   triggering a communication with an analytics library to determine, by using an identification algorithm, a derivation scenario corresponding to the object data, the derivation scenario being stored in a relational database and comprising derivation rules;
   determining modeled information based on the derivation rules;
   generating enriched data based on the object data and by using the modeled information;
   automatically verifying, using one or more verification rules until the one or more verification rules are satisfied and as verified enriched data, the enriched data, wherein the enriched data is further modified and adjusted until the one or more verification rules are satisfied;
   automatically using the verified enriched data to update master data records stored in the relational database; and
   displaying the verified enriched data.

9. The non-transitory, computer-readable medium of claim 8, further comprising:
   receiving a definition of the derivation scenario for the object data, the definition semantically describing a derivation logic defining a sequence of the derivation rules.

10. The non-transitory, computer-readable medium of claim 9, further comprising:
    assigning the derivation scenario and the derivation rules to an entity of a data model to implement a data change.

11. The non-transitory, computer-readable medium of claim 8, further comprising:
    receiving a rule scope corresponding to the object data; and
    filtering the derivation rules using the rule scope.

12. The non-transitory, computer-readable medium of claim 8, wherein each of the derivation rules comprises a set of condition fields and at least one result field.

13. The non-transitory, computer-readable medium of claim 8, wherein the derivation scenario generates the enriched data by applying a derivation scenario field rule or a derivation scenario table rule to derive data fields or data table entries for the object data, based on a table, a scope, and a field definition.

14. The non-transitory, computer-readable medium of claim 13, wherein the derivation scenario table rule derives lines used to modify original table data of the object data.

15. A computer-implemented system, comprising:
one or more processors; and
one or more computer memory devices interoperably coupled with the one or more processors and having tangible, non-transitory, machine-readable media storing one or more instructions that, when executed by the one or more processors, perform one or more operations comprising:
receiving a user input comprising object data;
triggering a communication with an analytics library to determine, by using an identification algorithm, a derivation scenario corresponding to the object data, the derivation scenario being stored in a relational database and comprising derivation rules;
determining modeled information based on the derivation rules;
generating enriched data based on the object data and by using the modeled information;
automatically verifying, using one or more verification rules until the one or more verification rules are satisfied and as verified enriched data, the enriched data, wherein the enriched data is further modified and adjusted until the one or more verification rules are satisfied;
automatically using the verified enriched data to update master data records stored in the relational database; and
displaying the verified enriched data.

16. The computer-implemented system of claim 15, further comprising:
receiving a definition of the derivation scenario for the object data, the definition semantically describing a derivation logic defining a sequence of the derivation rules.

17. The computer-implemented system of claim 16, further comprising:
assigning the derivation scenario and the derivation rules to an entity of a data model to implement a data change.

18. The computer-implemented system of claim 15, further comprising:
receiving a rule scope corresponding to the object data; and
filtering the derivation rules using the rule scope.

19. The computer-implemented system of claim 15, wherein each of the derivation rules comprises a set of condition fields and at least one result field.

20. The computer-implemented system of claim 15, wherein the derivation scenario generates the enriched data by applying a derivation scenario field rule or a derivation scenario table rule to derive data fields or data table entries for the object data, based on a table, a scope, and a field definition, wherein the derivation scenario table rule derives lines used to modify original table data of the object data.

* * * * *